United States Patent [19]

Toth

[11] Patent Number: 5,162,870
[45] Date of Patent: Nov. 10, 1992

[54] SUBSTRATE FOR RING LASER GYRO WITH NONUNIFORM OUTER RIM

[75] Inventor: Theodore A. Toth, Fridley, Minn.

[73] Assignee: Honeywell Inc., Minneapolis, Minn.

[21] Appl. No.: 683,206

[22] Filed: Apr. 9, 1991

[51] Int. Cl.$^5$ .............................................. G01C 19/66
[52] U.S. Cl. .................... 356/350; 372/107; 310/332
[58] Field of Search ............... 356/350; 372/107; 310/332

[56] References Cited

U.S. PATENT DOCUMENTS

| | | | |
|---|---|---|---|
| 4,113,387 | 9/1978 | Shutt | 356/350 |
| 4,824,253 | 4/1989 | Butler et al. | 356/350 |

Primary Examiner—Samuel A. Turner
Attorney, Agent, or Firm—Robert A. Pajak

[57] ABSTRACT

A mirror transducer substrate apparatus for mounting a light reflecting apparatus has outer walls of nonuniform thickness. The substrate apparatus has a mirror side and a driver side, the mirror side includes an optical surface. The optical surface includes a first trepan formed therein having a first radial dimension. The driver side includes a second trepan formed therein having a second radial dimension which is larger than the first radial dimension. The first and second trepans are structured and arranged to form a nonuniform outer wall integral with the substrate apparatus and a first central post member, integral with the substrate apparatus, having a driver side, a mirror side which is coplanar with the optical surface, and a central axis passing therethrough. A first flexible annular diaphragm area is affixed to the driver side of the substrate apparatus covering the second trepan. A force applied against the first flexible annular diaphragm area causes the central post to move substantially linearly with a selected temperature sensitivity of movement along the central axis in the direction of the applied force.

3 Claims, 7 Drawing Sheets

SUBSTRATE FOR RING LASER GYRO WITH NONUNIFORM OUTER RIM

RELATED APPLICATION

This application is being filed on the same date as the present assignee's application entitled THERMAL TUNING OF PATH LENGTH CONTROL DRIVERS, Albers, et al., U.S. patent application Ser. No. 07/682,840, filed Apr. 9, 1991.

BACKGROUND OF THE INVENTION

The present invention relates to mirror transducer apparatus. More particularly, the present invention relates to mirror transducer apparatus used in thermal tuning of path length control drivers for ring laser gyros.

Ring laser gyros of the type manufactured by Honeywell Inc. of Minneapolis, Minn. are well known. As its name implies, a ring laser gyro is a gyroscope which utilizes a laser beam directed to travel in a closed path, i.e., a ring, within a ring laser gyro block to detect rotation about the axis of the path around which the laser beam is directed. The ring laser gyro must be capable of operating over a wide range of temperatures. As a result, the material of which the gyroscope is made suffers thermal expansion and contraction as the temperature changes. The laser beam within the ring laser gyro is directed in its path by means of mirrors, typically in a triangular path having three mirrors. One mirror is located at each corner of the triangular path. Other types of ring laser gyros having other polygonal shapes, such as four sided ring laser gyros are also known, and they operate according to the same principles as discussed hereinabove. The temperature change resulting in expansion or contraction, causes a change in the path length.

Figure 12:
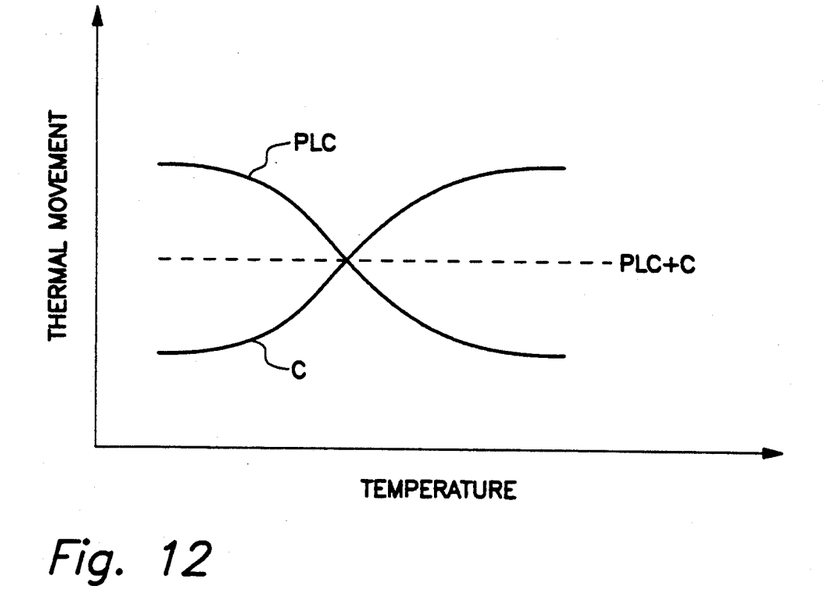
FIG. 12 shows graphically thermal movement of a ring laser gyro assembly and a path length control driver in relation to temperature.

In order to properly operate, ring laser gyros require a laser path which is maintained at a substantially constant length. This is important since the laser beam intensity is dependent upon the path length. Variations in the beam intensity can adversely affect the performance parameters of the gyro and such variations can cause gyro errors. In order to maintain a constant ring laser path length, a mirror transducer is commonly employed. Such mirror transducers compensate for thermal expansion effects which are inherent in the ring laser gyro members and which cause undesirable path length variations, by changing the position of at least one of the mirrors with reference to the ring laser gyro block. This effect is illustrated in FIG. 12 which shows a first curve PLC which represents selective movement of a mirror transducer substrate by a path length control driver, and a second curve C corresponding to path length variances of the ring laser gyro assembly with temperature. The desired result is to have the path length control driver force the mirror transducer substrate in an equal and opposite direction to that of the ring laser gyro assembly's movement as caused by the reaction to temperature changes. This is indicated by the dashed line PLC+C which represents the sum of the thermal movements of the path length control driver assembly and the ring laser gyro assembly. Such path length driver control effectively cancels any thermal movement of the ring laser gyro assembly, thereby maintaining a constant path length.

Mirror transducers for path length control in ring laser gyros have generally been fabricated with a variety of piezoelectric element driven transducer assemblies. Such assemblies have included one or more piezoelectric elements. Examples of piezoelectric control elements used in ring laser gyro applications are illustrated in U.S. Pat. No. 3,581,227 issued to Podgorski, U.S. Pat. No. 4,383,763 issued to Hutchings et al., U.S. Pat. No. 4,697,323 issued to Ljung, et al., and U.S. Pat. No. 4,488,080 issued to Baumann. A mirror substrate with selected thermal compensation is disclosed by Toth in U.S. Pat. No. 4,915,492.

Figure 1:
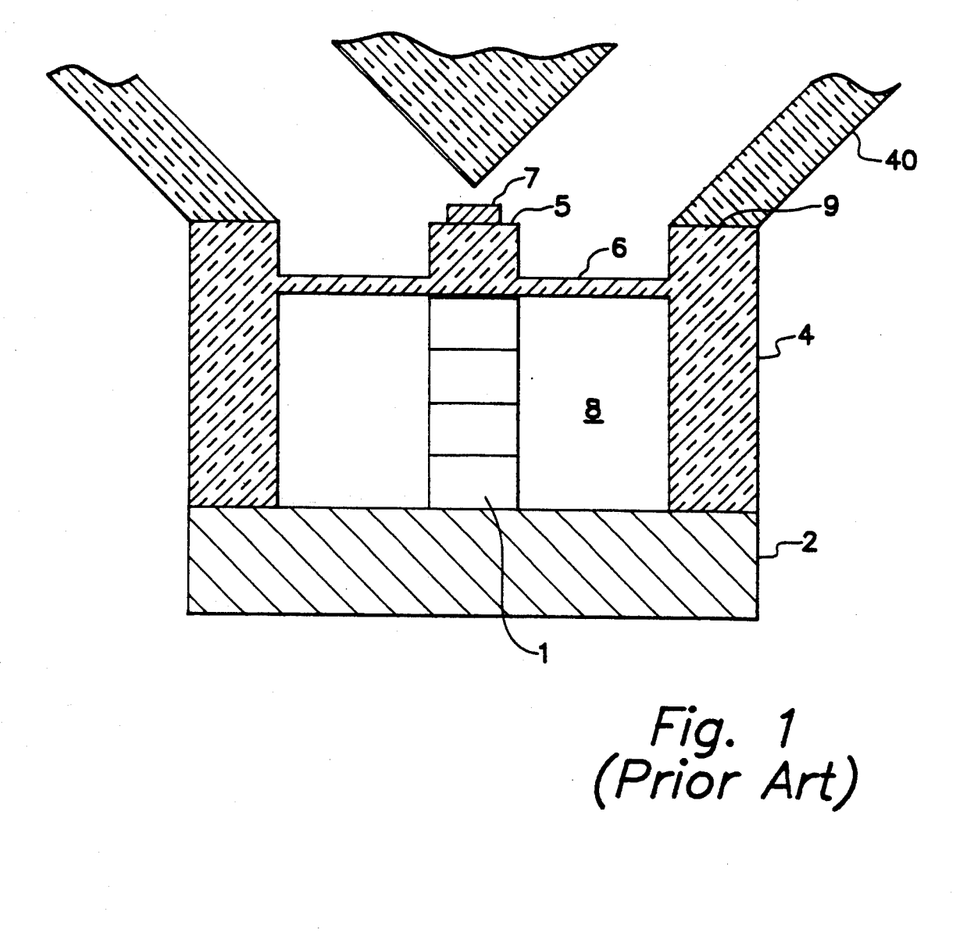
FIG. 1 shows schematically a cross-section of one example of a path length control driver assembly of the prior art.

In the '323 patent, as illustrated in FIG. 1, Podgorski shows and claims the use of a transducer block 4 composed of a dimensionally stable material which is mounted to a ring laser gyro block 40. The transducer block is circularly grooved on its internal side to leave a depressed thin integral gas impervious annular diaphragm 6 extending between a central post 5 and an outer rim 9. The central post is generally cylindrical and is inwardly-standing from and integral with the annular diaphragm. The outer rim is also integral with the annular diaphragm. A stack of piezoelectric ceramic wafers 1 is located in an opening 8 which is bored into the underside of block 4. The ceramic wafer stack 1 bears against the external side of the annular diaphragm and of the inwardly standing post 5. The opening containing the ceramic wafer stack is closed with a rigid disk-like member 2 which supports the stack of ceramic wafers. On the internal side of the central post 5 is a light reflecting means 7, generally provided by a deposition of selected materials to form a mirror. The transducer assembly is positioned on the laser block 40 to reflect the laser beams within the cavity provided by the laser block.

All of the other aforementioned patents utilize one or more of the principles taught by Podgorski. Honeywell Inc. of Minneapolis, Minn. has long used a double diaphragm mirror assembly which includes a piezoelectric driver assembly. One example of a double diaphragm mirror assembly is shown in Ljung et al. The mirror assembly includes a central post which is coupled to a driver assembly. The driver assembly is a cup-shaped metallic driver fixture having an annular diaphragm extending between an integral central member and outer rim member. The central member is rigidly coupled to or attached to the central post of the mirror assembly. A pair of symmetrical donut-shaped piezoelectric disks are positioned on opposite sides of the annular diaphragm to provide the transducer action.

Toth in U.S. Pat. No. 4,915,492, which is hereby incorporated by reference, discloses a mirror substrate comprised of a mirror assembly and a driver assembly. Both the mirror assembly and the driver assembly include a diaphragm portion surrounding an integral central post member. The central post members are rigidly coupled together to provide tandem translation movement along a central axis passing through the central post members. A pair of non-symmetrical piezoelectric disks are positioned on opposite sides of the diaphragm portion of the driver assembly. The sizes of the piezoelectric disks are selected to achieve a selected temperature sensitivity of movement of the tandem central members along an axis passing therethrough.

In operation, mirror transducers of the kind described hereinabove generally have a quite limited range of movement. Therefore, in ring laser gyro applications a mode reset circuit is often employed to maintain the transducer within its operating range. Herein mode is defined as the equivalent of one wavelength of the laser beam. For a helium-neon laser, one mode is equal to 6328 microns which is equal to 24.91 microinches. Temperature changes of the gyro laser block as well as the transducer assembly, itself, are primary contributors to path length changes of the laser beam. Unfortunately, each "mode reset" of the transducer contributes to the overall gyro performance error budget.

In practicing the present invention, electrodes are used as compensating elements of a path length control driver. Using electrodes in this way provides a more reproducible compensation capability. As noted hereinabove, piezoelectric material size or thickness was also used as a compensating element. However, it is difficult to obtain constantly reproducible driver controlled thermal compensation capability by varying the piezoelectric material thickness. The required thermal compensation for a more easily producible design requires more compensation than the piezoelectric material sizing technique provides. This is particularly true, if mode resets are to be avoided. In one aspect of the instant invention, the electrode and piezoelectric ceramic material employed by the invention are analogous to fine and coarse tuning elements respectively. Therefore, the electrode and the piezoelectric material compliment each other quite well from a thermal compensation viewpoint.

SUMMARY OF THE INVENTION

A mirror transducer substrate apparatus for mounting a light reflecting apparatus, the mirror transducer substrate apparatus is provided. A substrate apparatus having a mirror side and a driver side, wherein the mirror side includes an optical surface. The optical surface includes a first trepan formed therein. The first trepan has a first radial dimension and the driver side includes a second trepan formed therein. The second trepan has a second radial dimension which is larger than the first radial dimension, and the first and second trepans are structured and arranged to form a nonuniform outer wall integral with the substrate apparatus and a first central post member, integral with the substrate apparatus, having a driver side, a mirror side which is coplanar with the optical surface, and a central axis passing therethrough. A first flexible annular diaphragm area being affixed to the driver side of the substrate apparatus covering the second trepan.

Other objects, features and advantages of the invention will be apparent through the detailed description, claims and drawings herein, wherein like numerals refer to like elements.

DETAILED DESCRIPTION OF THE PREFERRED EMBODIMENT OF THE INVENTION

Figure 2:
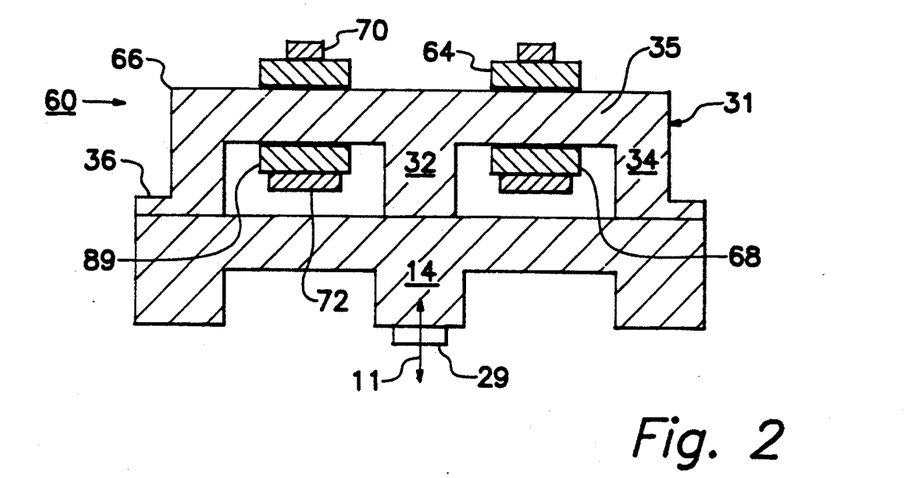
FIG. 2 shows schematically a cross-section of one example of a path length control driver assembly fabricated in accordance with one embodiment of the present invention.

The examples and embodiments described herein are meant by way of illustration of the techniques disclosed by the invention and are not intended to be limiting to the scope of the invention. FIG. 2 shows one example of a path length control driver and mirror transducer substrate as contemplated by the present invention.

The path length control driver 60 includes a base plate member 31 generally having a cupped shape. The base plate member 31 includes a central post member 32, an outer rim member 34, and an annular diaphragm member 35 extending between and integral with central post member 32 and outer rim member 34. Extending from outer rim member 34 is a mounting flange 36. The base plate 31 may preferably be comprised of a low thermal coefficient material such as, for example, invar or super invar material. The first piezoelectric ceramic material 64 is mounted to the top surface 66 of the base plate. The piezoelectric material 64 may advantageously have a disk or donut shape. A second piezoelectric ceramic material 68, which may be generally donut-shaped is affixed to the annular diaphragm member 35 on the opposite side of the top surface 66. A first ring electrode 70 is rigidly affixed to the first piezoelectric ceramic material 64. A second ring electrode 72, of a selectively differing size and/or shape than the first ring electrode 70, is rigidly affixed to the second piezoelectric ceramic material 68. The first and second electrodes advantageously have selected and differing shapes and sizes so as to provide a selected temperature sensitivity of movement of the central member along the central axis 11.

Figure 3:
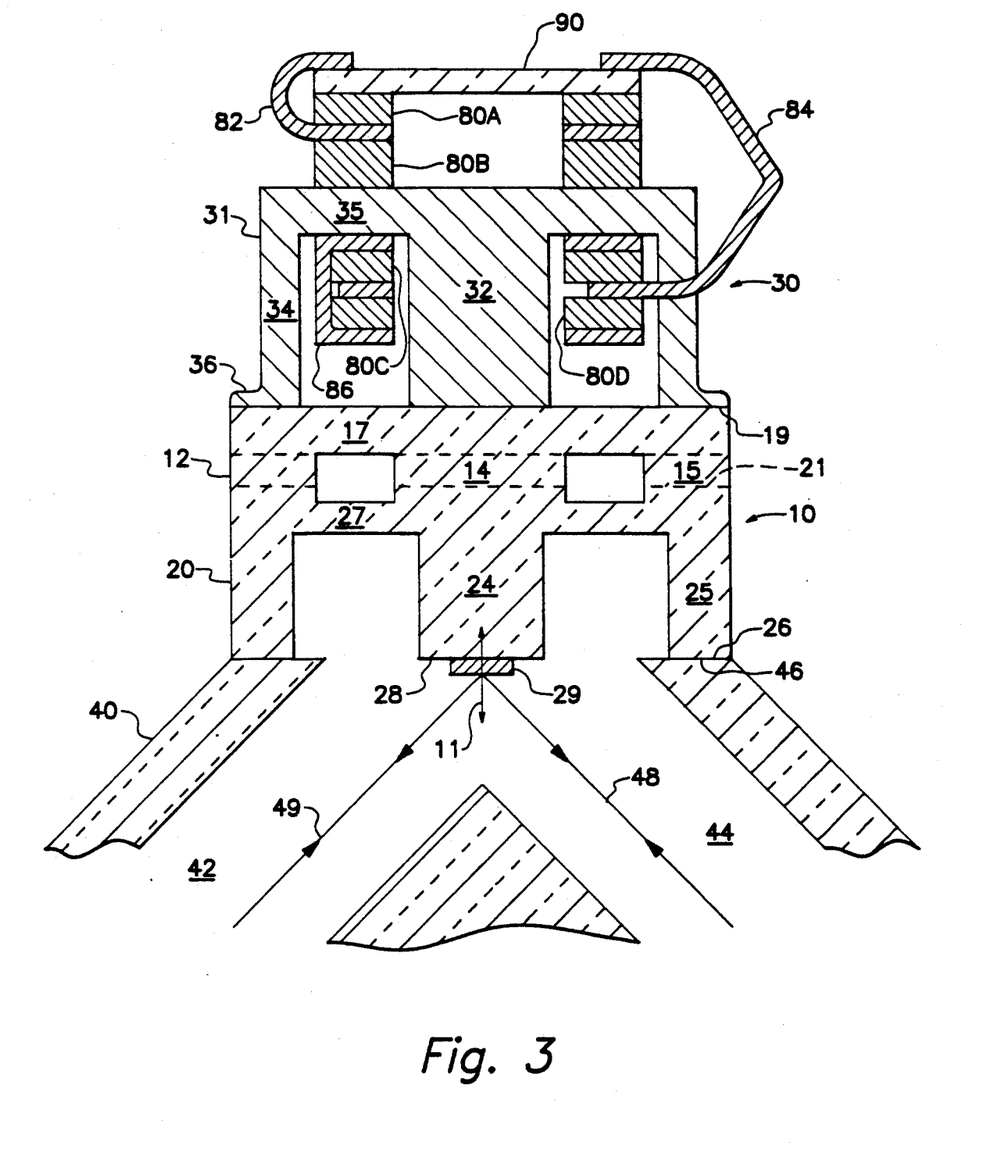
FIG. 3 shows schematically a cross-section of another example of a path length control driver assembly fabricated in accordance with an alternative embodiment of the present invention including a mirror transducer substrate.

Referring now to FIG. 3, a path length control driver assembly 30 attached to a mirror transducer substrate 10 is shown. A double diaphragm mirror assembly is illustrated. It is generally cylindrically shaped and includes a top half 12 and a bottom half 20 being E-shaped in cross section. Top half 12 includes a central post member 14, an outer rim member 15, and a thin annular diaphragm member 17 extending radially between central post member 14 and outer rim member 15. Similarly, bottom half 20 includes a central post member 24, outer rim member 25 and a thin annular diaphragm member 27 extending between central member 24 and outer rim member 25. Outer rim member 25 includes a mounting surface 26. Further, central post member 24 includes an external surface 28 having either a mirror or reflective means 29, generally being a multilayer dielectric mirror.

In some cases the mirror transducer substrate 10 may comprise two individual piece parts, E-shaped in cross section, forming the top half 12 and the bottom half 20 and joined at their interface 21. Alternatively, a cylindrical block may be provided with top and bottom trepans to form diaphragm 27. In such a case the other diaphragm 17 is provided by a disk and joined to the bottom half to create the double diaphragm 17, 27. Another embodiment of the mirror transducer substrate assembly 10 may be a single block which is bored to provide the double diaphragm member 17, 27 as illustrated.

Mirror transducer substrate assembly 10 is shown rigidly affixed to a corner of a ring laser gyro block 40 having a pair of interconnecting tunnels 42 and 44. Laser block 40 generally includes a mounting surface 46 which is affixed to surface 26 of outer rim member 25 for providing a generally gas tight seal therebetween.

Mirror transducer substrate assembly 10 is positioned on laser block 40 such that laser beams 48 and 49 can reflect from mirror 29 in a well known manner. Path length control driver assembly 30 is comprised of a generally cup-shaped driver fixture 31 including a central post member 32, an outer rim member 34, and an annular diaphragm member 35 extending between and integral with central post member 32 and outer rim member 34. Extending from outer rim member 34 is a mounting flange 36 which is secured to the mirror assembly outer rim member 15 at surface 19 thereof. Further, central post member 32 is affixed to central post member 14 at surface 19 thereof. A plurality of circular donut-shaped piezoelectric ceramic material elements 80A, 80B, 80C and 80D are also shown. A first plurality of at least two piezoelectric material elements 80A and 80B is stacked and rigidly affixed to the top surface of base plate member 31. A second plurality of piezoelectric ceramic material elements 80C, 80D is stacked and rigidly affixed to the bottom surface of base plate 31 substantially surrounding central post 32. In one embodiment of the invention, each of the individual piezoelectric material elements is identical in size, shape and piezoelectric material to the other piezoelectric elements. First, second and third electrodes 82, 84, and 86 respectively are rigidly affixed to selected ones of the piezoelectric ceramic material elements. A fourth electrode 87 (not shown in this view but shown in FIG. 5) is juxtaposed between the top of the base plate and element 80B. The electrodes may also advantageously be generally donut-shaped. A more detailed diagram of one example of the electrode and piezoelectric ceramic material connections made in accordance with the invention is shown schematically in FIG. 5 described hereinbelow.

Figure 4:
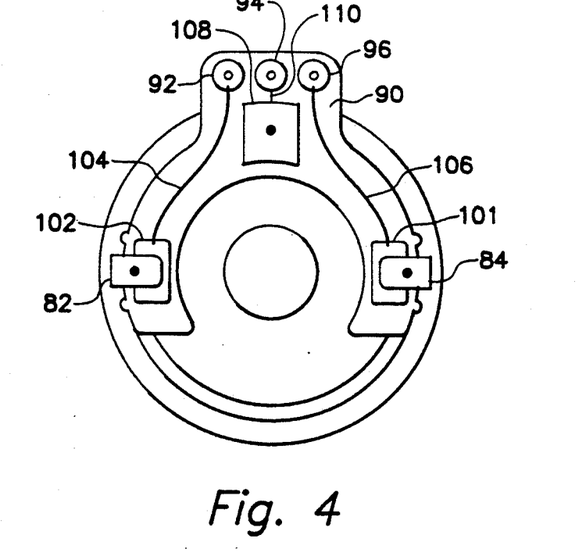
FIG. 4 shows schematically a top view the path length control driver of FIG. 3.

FIG. 4 shows a top view of the path length control driver of FIG. 3 as contemplated by the present invention. The first electrode 82 is affixed to the flex tape 90 at terminal 102 which is, in turn, connected to a first post terminal 92 by means of a first conductor 104 imbedded within the flex tape. The second electrode 84 is connected to a second terminal 101 which is connected by means of a second conductor 106 imbedded within the flex tape to a second post terminal 96. A third terminal 108 is connected by means of a third conductor 110 imbedded within the flex tape to a third terminal post 94. Terminal posts 92, 94 and 96 respectively are connected to voltage potential sources as are further described with respect to FIG. 5.

Figure 5:
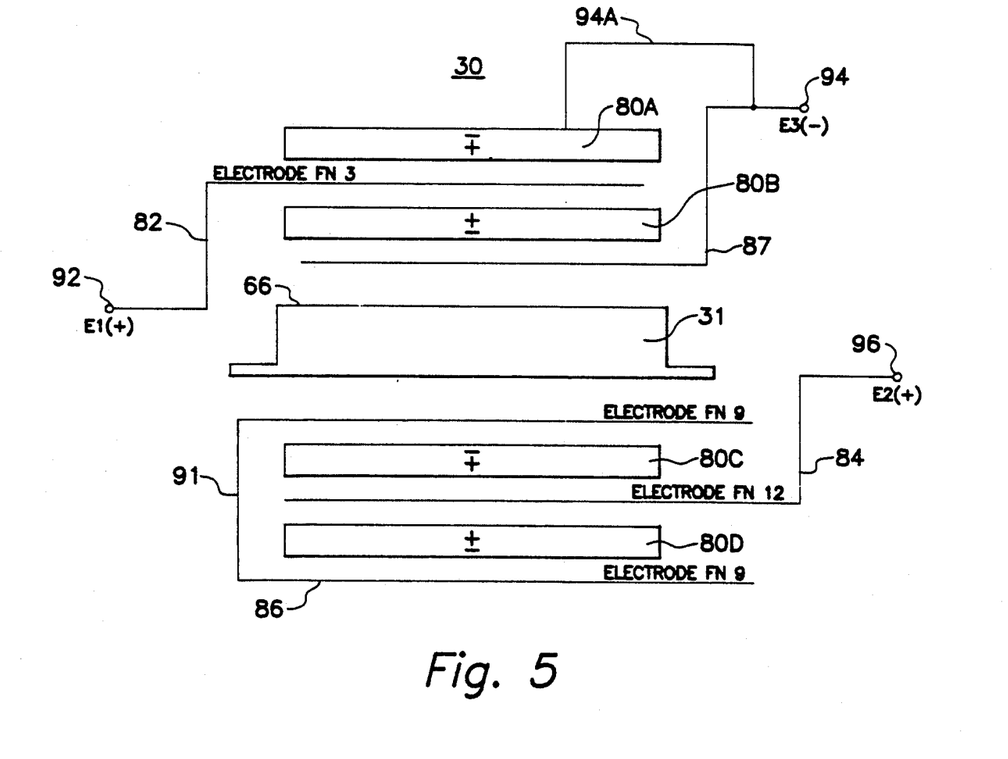
FIG. 5 shows schematically an electrical circuit diagram of an example of a path length control driver assembly made in accordance with one embodiment of the present invention including stacked piezoelectric material elements.
Figure 6:
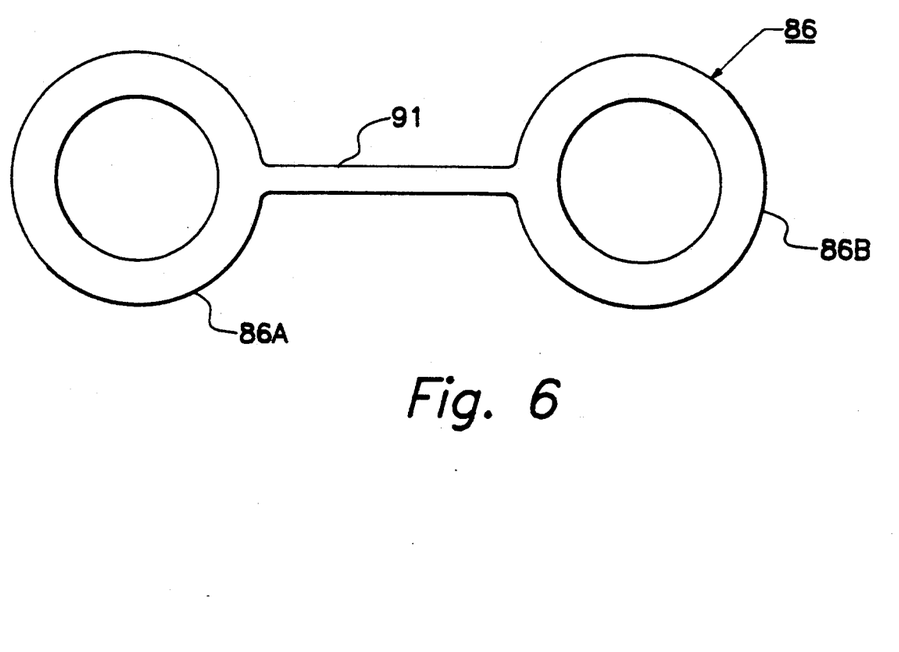
FIG. 6 shows a top view of one example of an electrode employed in a path length controller made in accordance with the present invention.

Referring now to FIG. 5, one embodiment of a detailed electrical circuit diagram of the path length control driver 30 shown in FIGS. 3 and 4 is shown. First, second, third and fourth piezoelectric ceramic material elements 80A, 80B, 80C and 80D are shown wherein elements 80A and 80B are arranged to be affixed to the top of base plate 31 and elements 80C and 80D are arranged to be affixed to the bottom of base plate 31. Interposed between piezoelectric ceramic elements 80A and 80B is the first electrode 82 which is connected to a positive potential E1 through terminal post 92. A second electrode 84 is interposed and rigidly bonded between piezoelectric ceramic material elements 80C and 80D and further connected to a second positive electrical potential E2 through terminal post 96. The third electrode 86 wraps around the outer surfaces of piezoelectric ceramic material elements 80C and 80D. The fourth electrode 87 is affixed between the second piezoelectric material element 80B and the top surface 66 of the base plate. A fifth electrode 94A, which may advantageously comprise a wire in some cases, is connected between the negative polarity side of piezoelectric element 80A and terminal 94. The electrodes are rigidly bonded by well known means such as electrically conductive epoxy to the various elements and the base plate. All of the electrodes in this example may advantageously be generally ring or donut-shaped with the exceptions of the third and fifth electrodes 86, 94A. The third electrode 86 is illustrated in FIG. 6, and is comprised of two generally donut-shaped members 86A and 86B connected by a connecting member 91.

Figure 7:
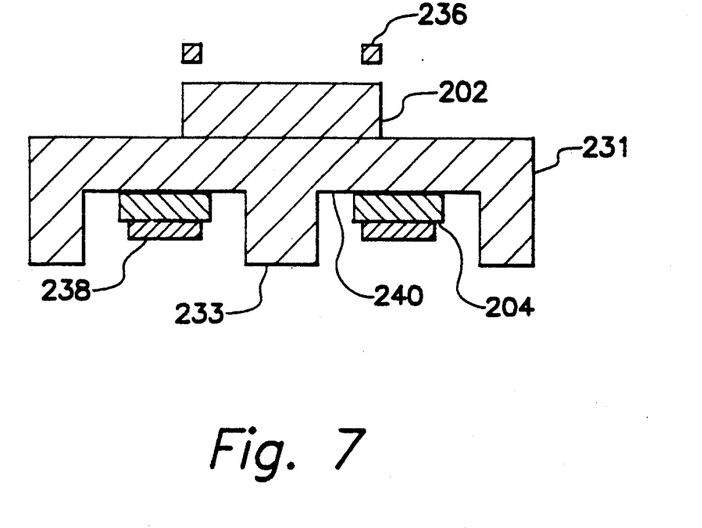
FIG. 7 shows schematically a cross-section of a path length controller of the invention having piezoelectric elements of differing thicknesses.

Referring now to FIG. 7 yet another embodiment of the invention illustrating a thermal tuning apparatus utilizing a combination of selected piezoelectric elements and electrode designs is shown. A first piezoelectric element 202 is mounted to a base plate 231 and a second piezoelectric material element 204 is mounted within a trepan 240 in the base plate 231 surrounding a center post 233. A first ring electrode 236 is rigidly affixed to the first piezoelectric ceramic material element 202. A second ring electrode 238 is rigidly affixed to the second piezoelectric ceramic material 204. It has been found that by varying the thicknesses of the first and second piezoelectric ceramic materials thermal tuning of path length within a ring laser gyro can be controlled. In this case, the first piezoelectric ceramic material 202 has a first selected thickness which is greater than a second selected thickness of the second piezoelectric material element 204. Further control may be achieved by also varying the shapes, thicknesses and/or annular surface areas of the first and second ring electrodes 236, 238. That is, the inside and outside diameters of the donut-shaped electrodes may be advantageously be non-symmetrical to selectively achieve a desired temperature sensitivity.

Figure 8:
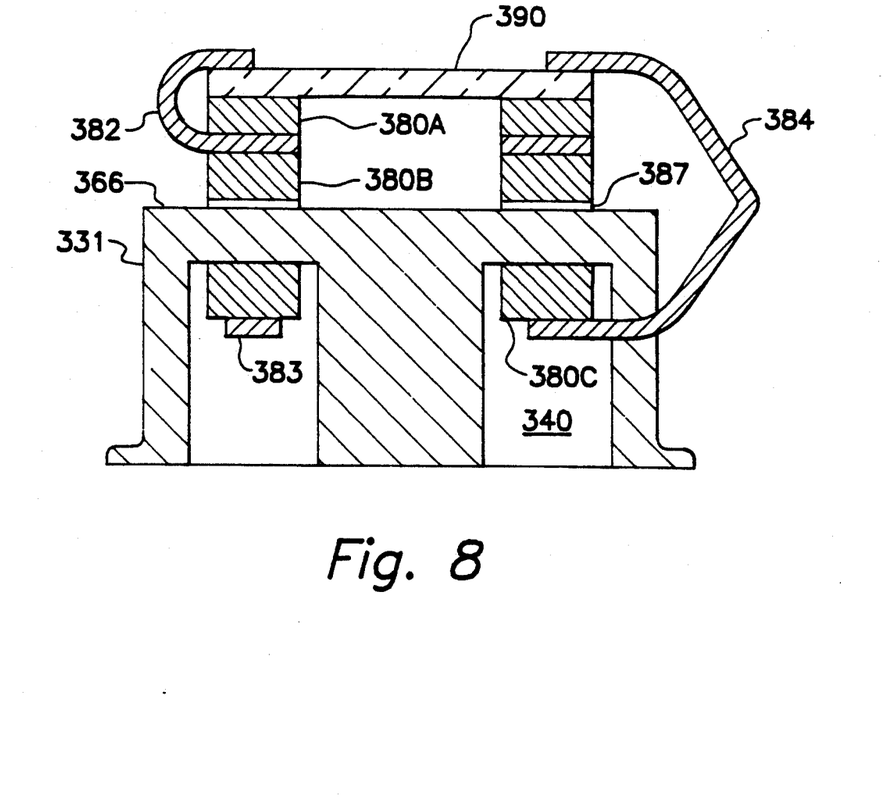
FIG. 8 shows schematically a cross-section view of a path length controller of the invention having differing numbers of piezoelectric ceramic elements on opposite surfaces of a base plate.

Referring now to FIG. 8, yet another alternative embodiment of the invention is shown wherein a base plate 331 has a top surface 366. A first stack of a plurality of piezoelectric ceramic material elements 380A and 380B is rigidly affixed to the top surface 366. A first electrode 382 is rigidly affixed between the first and second piezoelectric material elements 380A and 380B. A second electrode 387 may be rigidly affixed between the top 366 of the base plate and the second piezoelectric material element 380B. As in the examples described herein above a trepan 340 in base plate 331 allows placement of a third piezoelectric material 380C which is of the same shape and size of elements 380A and 380B and has yet a third electrode 383 rigidly bonded to it. In this way, by varying the number, of similarly sized and shaped piezoelectric ceramic material elements, and/or by varying the number, shapes and sizes of electrodes it has been found that thermal tuning of path length control drivers can be achieved. Of course, the polarity of compensation caused by the differing number of piezoelectric elements depends on the location of the greater number or larger sized piezoelectric elements.

Figure 9:
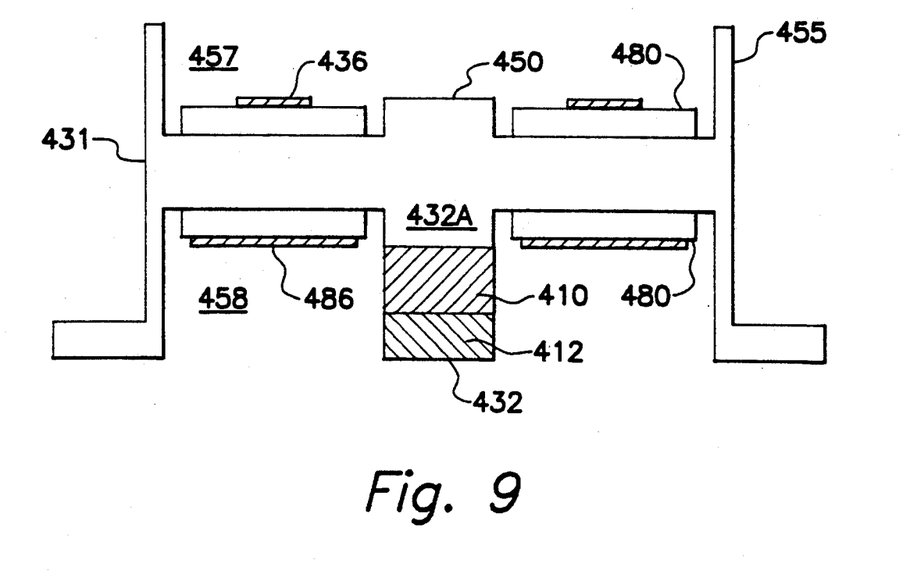
FIG. 9 shows schematically a cross-section view of a path length controller according to an alternative embodiment of the invention employing an extended outer rim on the base plate member.

Referring now to FIG. 9 yet another alternative embodiment of a path length control driver system with thermal tuning is shown. The apparatus includes a base plate 431 having an outer rim 455 and a central member 450 surrounded by a top trepan 457. A bottom trepan 458 surrounds a central post 432. In one example of the invention the central post 432 may comprise a plurality of at least three stacked materials including a first material 432A integral with the base plate having a first coefficient of thermal expansion, a second material 410 having yet a second coefficient of thermal expansion, and a third material 412 having yet a third coefficient of thermal expansion. The path length control driver may also advantageously include piezoelectric elements 480 of similar donut-shaped material in the top and bottom trepans. Any combination of the features of the central member 450 and outer ring 455, non-symmetrical top and bottom electrodes 436 and 486 and/or varying materials on the center post 432 can be advantageously used to achieve thermal tuning of the path length control driver. The use of different materials having mismatched coefficients of thermal expansion in the center post 432 is explained in more detail hereinbelow with reference to FIG. 10.

Figure 10:
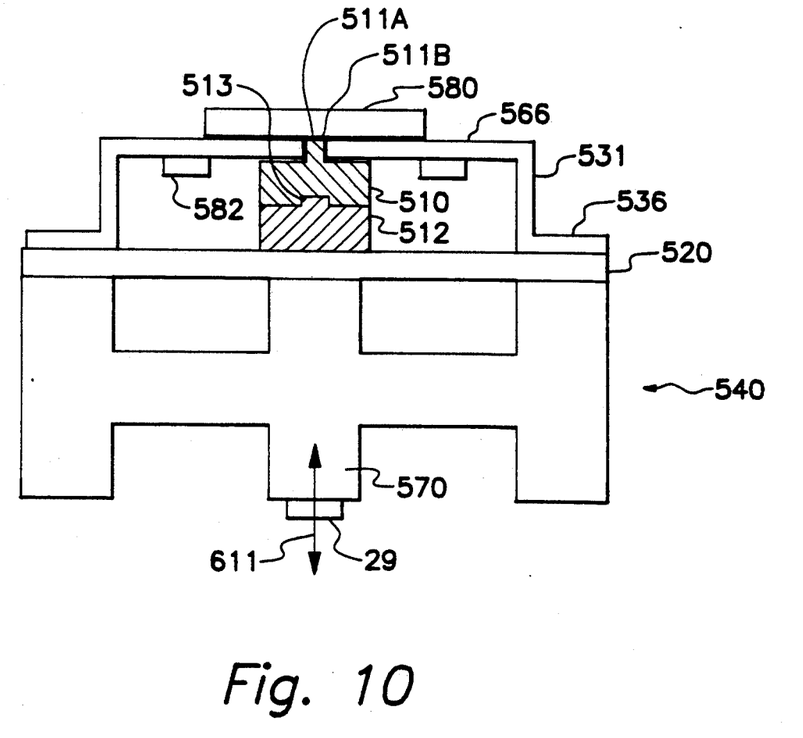
FIG. 10 shows yet another alternative embodiment of the invention employing a juxtapositioned pair of post members of varying thermal expansion properties.

Referring now to FIG. 10, yet another alternative embodiment of a path length control driver as contemplated by the invention and mounted to a mirror transducer substrate is shown. The path length control driver comprises a base plate 531 having a receiving aperture 512. The base plate 531 has a top surface 566 on which is mounted a piezoelectric material element 580 which may advantageously be disk-shaped. The base plate includes flanges 536 which are rigidly affixed to the mirror transducer substrate 540. A juxtapositioned pair of post members 510, 512 having different thermal expansion coefficients is located by means of alignment member 511A within the receiving aperture 511B of the base plate and rigidly affixed to a top member 520 of the mirror transducer substrate 540. A second piezoelectric, donut-shaped material 582 is rigidly affixed to the underside of base plate 531. Piezoelectric ceramic material element 582 forms an annular ring around the juxtapositioned pair of post members 510 and 512. The juxtapositioned pair of post members 510 and 512 is located about a central axis denoted by arrow 611. The mirror transducer substrate 540 includes a central post member 570 including a mirror 29 which is rigidly affixed in line with the central axis denoted by arrow 611. As the juxtapositioned pair of post members 510, 512 moves in a direction along arrow 611 mirror 29 follows the movement of the post members in a tandem fashion. The juxtapositioned pair of post members 510, 512 are selected so as to yield a predetermined movement of the mirror 29 in a linear direction denoted by arrow 611. In this way, thermal tuning of the driver and mirror transducer substrate is achieved.

Figure 11:
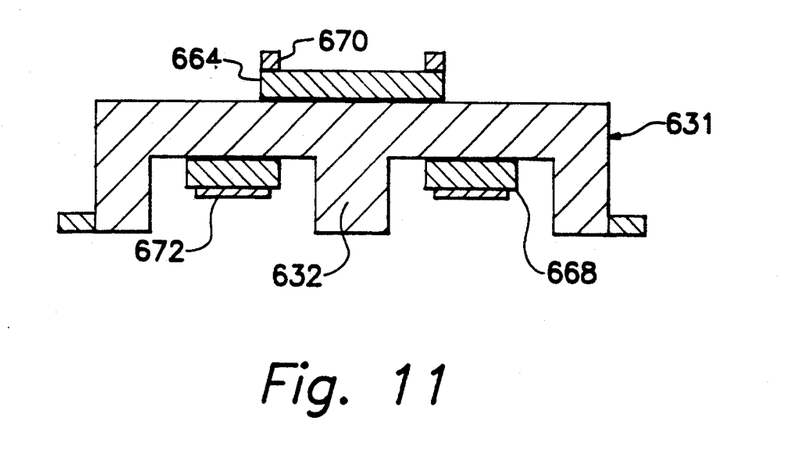
FIG. 11 shows yet another alternative embodiment of the invention employing electrodes of different thicknesses to create a selected thermal sensitivity for tuning a path length control driver.

FIG. 11 shows yet another alternative embodiment of the invention wherein electrodes of different thicknesses are employed to achieve a desired temperature sensitivity of movement for the purpose of thermal tuning of a path length control assembly 631. A first electrode 670 having a first selected thickness is rigidly affixed to a first piezoelectric element 664. A second electrode 672 having a second selected thickness, which is different than the first selected thickness of the first electrode, is rigidly affixed to a second piezoelectric element 668. By varying the electrode thicknesses, selected temperature sensitivities of movement of the central member 632 can be achieved.

Figure 13:
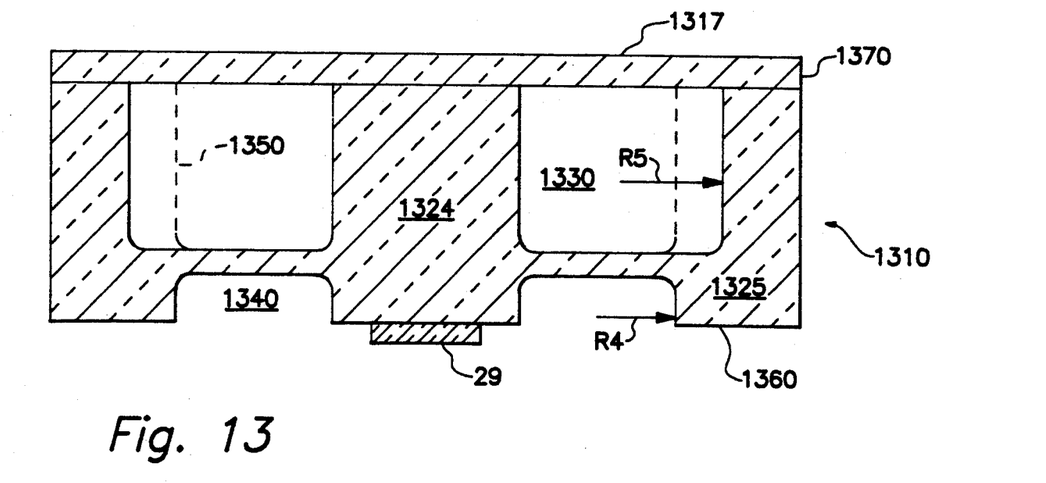
FIG. 13 shows an improved mirror transducer substrate for use with the path length control driver of the present invention.

Referring now to FIG. 13, an improved mirror substrate 1310 for use with the path length control driver of the present invention is shown. The mirror substrate 1310 has a mirror side and a driver side and features an outer rim 1325 having a nonuniform thickness. The mirror side of the mirror transducer substrate has an optical surface 1360. A mirror 29 is rigidly affixed to the optical surface 1360. A first trepan on the driver side of the mirror transducer substrate has a first radius R5. A second trepan on the mirror side of the mirror transducer substrate has a second radius R4. As indicated by the broken line 1350, R5 is preferably a larger radius than R4 resulting in the nonuniform wall thickness of outer rim 1325. A cover member 1370 is rigidly affixed to the outer rim and central post 1324 to form a diaphragm 1317. The diaphragm 1317 is advantageously made thinner than previous designs. In contrast to known designs, the more slender cylindrical portion of outer rim 1325 absorbs most of the thermal forces produced by a path length control driver.

The mirror transducer substrate 1310 of FIG. 13, by departing from uniform outer wall thicknesses used in known designs, reduces mirror and optical surface deformation. In one example, improvements were achieved by changing dimension R5 from 0.200 to 0.240 inches. The resulting more slender cylinder absorbs most of the thermal forces produced by the path length control driver and protects the optical surface from distortion.

It should be understood that various modifications may be made to the apparatus as disclosed herein without departing from the spirit and scope of the invention. Consequently, the present invention is not intended to be limited to the particular embodiment and apparatus shown in the drawings except as defined by the appended claims. For example, thermal compensation characteristics can also be modified by using alternative materials for the path length controller base plate. As a further example, varying the strength of the base plate rim or hoop may also advantageously vary the thermal characteristics of the assembly. This may be accomplished by, for example, breaking the hoop in a selected area, adding an alternative material around the hoop or varying the wall thickness of the base plate.

I claim:

1. A mirror transducer substrate apparatus for mounting a light reflecting means, the mirror transducer substrate apparatus comprising:
   (a) a substrate means having a mirror side and a driver side, wherein the mirror side includes an optical surface;
   (b) wherein the optical surface includes a first trepan formed therein, the first trepan having a first radial dimension and the driver side includes a second trepan formed therein, the second trepan having a second radial dimension which is larger than the first radial dimension, and wherein the first and second trepans are structured and arranged to form a nonuniform outer wall integral with the substrate means and a first central post member, integral with the substrate means, having a driver side, a mirror side which is coplanar with the optical surface, and a central axis passing therethrough;
   (c) a first flexible annular diaphragm area being affixed to the driver side of the substrate means covering the second trepan; and
   (d) wherein a force applied against the first flexible annular diaphragm area causes the central post to move substantially linearly with a selected temperature sensitivity of movement along the central axis in the direction of the applied force.

2. A mirror transducer substrate apparatus comprising:
   (a) a substrate means having a mirror side and a drive side, wherein the mirror side includes an optical surface;
   (b) wherein the optical surface includes a first trepan formed therein, the first trepan having a first radial dimension and the drive side includes a second trepan formed therein, the second trepan having a second radial dimension which is larger than the first radial dimension, and wherein the first and second trepans are structured and arranged to form a nonuniform outer wall intergral with the substrate means and a first central post member, integral with the substrate means, having a driver side, a mirror side which is coplanar with the optical surface, and a central axis passing therethrough;
   (c) a first flexible annular diaphragm area being affixed to the driver side of the substrate means;
   (d) a light reflecting means rigidly mounted to the mirror side of the central post member; and
   (e) wherein a force applied against the first flexible annular diaphragm area causes the central post to move substantially linearly with a selected temperature sensitivity of movement along the central axis in the direction of the applied force.

3. A method for manufacturing a mirror transducer substrate apparatus for mounting a light reflecting means, the method comprising the steps of:
   (a) forming an optical surface on a substrate means having a mirror side and a driver side, wherein the optical surface is formed on the mirror side;
   (b) forming a first trepan on the optical surface, the first trepan having a first radial dimension;
   (c) forming a second trepan on the driver side formed, the second trepan having a second radial dimension which is larger than the first radial dimension, and wherein the first and second trepans are structured and arranged to form a nonuniform outer wall integral with the substrate means and a first central post member, integral with the substrate means, having a driver side, a mirror side which is coplanar with the optical surface, and a central axis passing therethrough; and
   (d) affixing a first flexible annular diaphragm area to the driver side of the substrate means covering the second trepan wherein a force applied against the first flexible annular diaphragm area causes the central post to move substantially linearly with a selected temperature sensitivity of movement along the central axis in the direction of the applied force.

* * * * *